(12) United States Patent
Ninomiya et al.

(10) Patent No.: US 9,478,362 B2
(45) Date of Patent: Oct. 25, 2016

(54) ELECTRICAL STORAGE UNIT

(75) Inventors: Tooru Ninomiya, Osaka (JP); Susumu Nishimoto, Nara (JP); Akihiko Souda, Kanagawa (JP)

(73) Assignees: PANASONIC CORPORATION, Osaka (JP); KOMATSU LTD., Tokyo (JP)

( * ) Notice: Subject to any disclaimer, the term of this patent is extended or adjusted under 35 U.S.C. 154(b) by 505 days.

(21) Appl. No.: 13/377,871

(22) PCT Filed: Feb. 24, 2010

(86) PCT No.: PCT/JP2010/001218
§ 371 (c)(1),
(2), (4) Date: Dec. 13, 2011

(87) PCT Pub. No.: WO2010/150439
PCT Pub. Date: Dec. 29, 2010

(65) Prior Publication Data
US 2012/0082887 A1    Apr. 5, 2012

(30) Foreign Application Priority Data

Jun. 26, 2009    (JP) ................................ 2009-151678

(51) Int. Cl.

| | | |
|---|---|---|
| *H01M 2/10* | (2006.01) | |
| *H01M 2/22* | (2006.01) | |
| *H01G 9/26* | (2006.01) | |
| *H01G 9/08* | (2006.01) | |
| *H01G 11/10* | (2013.01) | |
| *H01G 11/82* | (2013.01) | |
| *H01M 2/20* | (2006.01) | |
| *H01M 10/6555* | (2014.01) | |
| *H01M 10/643* | (2014.01) | |

(52) U.S. Cl.
CPC .................. *H01G 9/26* (2013.01); *H01G 9/08* (2013.01); *H01G 11/10* (2013.01); *H01G 11/82* (2013.01); *H01M 2/105* (2013.01); *H01M 2/204* (2013.01); *H01M 10/643* (2015.04); *H01M 10/6555* (2015.04); *Y02E 60/13* (2013.01)

(58) Field of Classification Search
CPC . H01M 2/1016; H01M 2/1072; H01M 2/105
See application file for complete search history.

(56) References Cited

U.S. PATENT DOCUMENTS

| 6,410,184 B1 * | 6/2002 | Horiuchi et al. ............. 429/156 |
|---|---|---|
| 7,470,485 B2 | 12/2008 | Kang et al. |
| 2001/0022404 A1 * | 9/2001 | Yamamoto et al. .......... 257/783 |
| 2003/0186114 A1 | 10/2003 | Lohr et al. |
| 2010/0247994 A1 * | 9/2010 | Park et al. ...................... 429/96 |

FOREIGN PATENT DOCUMENTS

| CN | 1449072 | 10/2003 |
|---|---|---|
| CN | 101385160 | 3/2009 |
| JP | 52-118300 | 10/1977 |
| JP | 11-269438 | 10/1999 |
| JP | 2000-223165 | 8/2000 |
| JP | 2003-168413 | 6/2003 |
| JP | 2005-285458 | 10/2005 |
| JP | 2005-317458 | 11/2005 |
| JP | 2005-317459 | 11/2005 |
| JP | 2006-134801 | 5/2006 |
| JP | 2007-095483 | 4/2007 |

OTHER PUBLICATIONS

JP 2005285458—Translation.*

* cited by examiner

*Primary Examiner* — Ladan Mohaddes
(74) *Attorney, Agent, or Firm* — Hamre Schumann, Mueller & Larson, P.C.

(57) ABSTRACT

A plurality of electrical storage elements (11) are electrically connected to each other, and parts of the peripheral surfaces of the electrical storage elements (11) contained in concave surfaces (29) are joined to the concave surfaces (29) with double-sided adhesive tape (35), so that the electrical storage elements (11) can be firmly fixed to a holder (27), and heat can be efficiently transferred from the electrical storage elements (11) to the holder (27) through the double-sided adhesive tape (35).

13 Claims, 8 Drawing Sheets

PRIOR ART

FIG. 8

PRIOR ART

ELECTRICAL STORAGE UNIT

TECHNICAL FIELD

The present invention relates to an electrical storage unit in which electric power is stored in electrical storage elements and is discharged when necessary.

BACKGROUND ART

An electrical storage unit (for example, see Patent Literatures 1 and 2) including a plurality of electrical storage elements such as secondary batteries and large-capacity capacitors has been widely used to store and discharge electric power as necessary.

The conventional art of the electrical storage unit will be described below with reference to the accompanying drawings.

Figure 7:
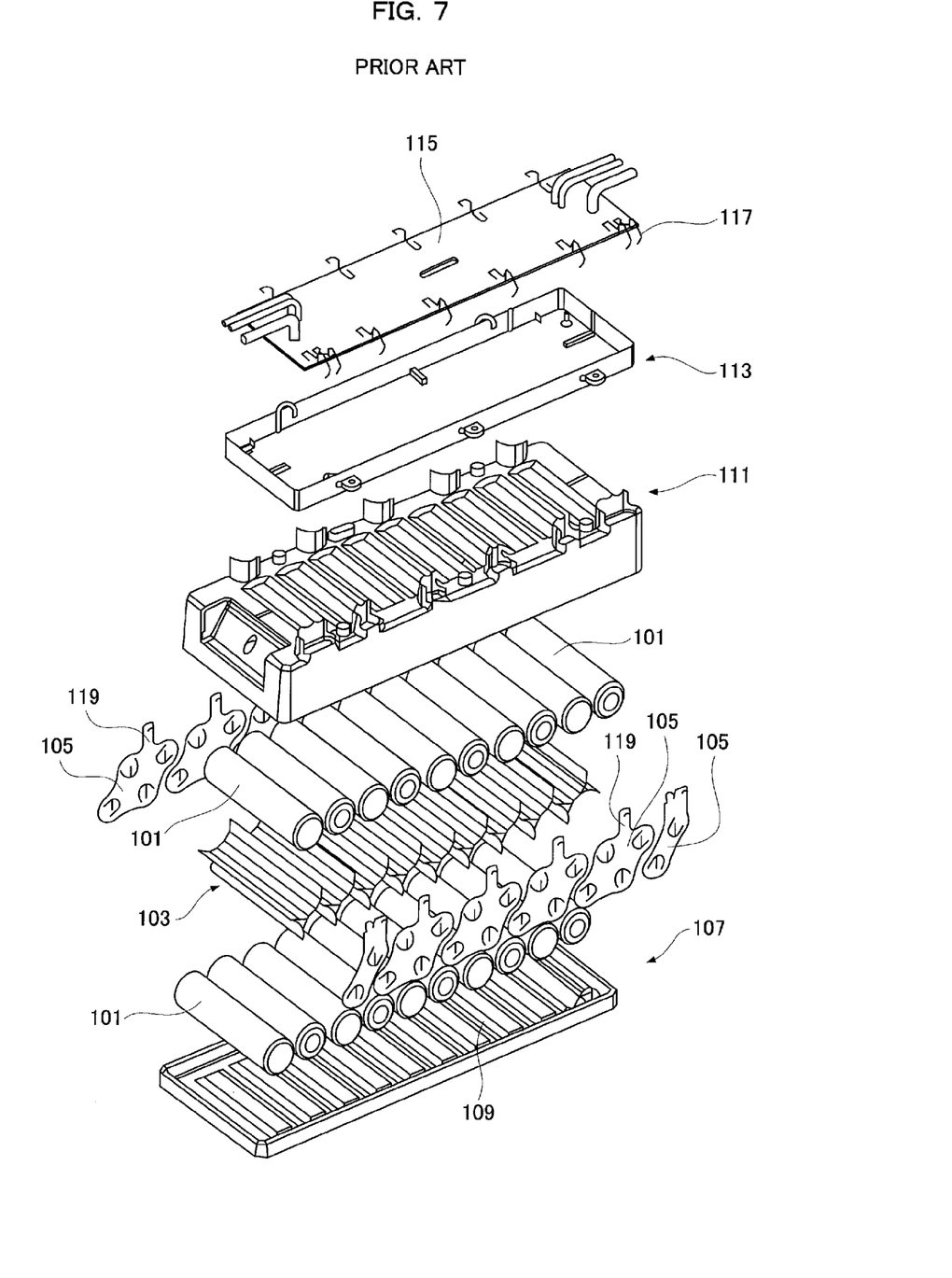
FIG. 7 is an exploded perspective view showing the overall structure of a battery pack (electrical storage unit) according to the related art.

FIG. 7 is an exploded perspective view showing the overall structure of the electrical storage unit according to the related art. The electrical storage unit is a battery pack disclosed by Patent Literature 1. In the battery pack, as shown in FIG. 7, a plurality of batteries 101 are stacked by a spacer 103. Further, positive and negative electrodes are provided on two ends of the battery 101, and the batteries 101 are arranged such that the adjoining positive and negative electrodes are opposite to each other.

To the electrodes of the batteries 101 arranged in two layers by the spacer 103, a plurality of battery lead plates 105 are electrically connected. Thus, the batteries 101 are connected in series-parallel.

Out of the batteries 101 configured thus, the batteries 101 in the lower layer are contained along guide grooves 109 provided in a lid case 107. At this point, the batteries 101 are fixed by double-sided adhesive tape (not shown) attached to the guide grooves 109.

The lid case 107 is covered with a body case 111 over the batteries 101. A circuit board 115 is placed on the top surface of the body case 111 via a board holder 113. A plurality of output leads 117 are electrically connected to the circuit board 115, and the output leads are electrically connected to connection terminals 119 integrally formed on the battery lead plates 105.

In this configuration, the batteries 101 are stacked to eliminate a redundant space, resulting in a size reduction, and parts of the side surfaces of the batteries 101 are fixed to the lid case 107 with the double-sided adhesive tape, so that a battery pack excellent in resistance to vibrations can be realized.

CITATION LIST

Patent Literatures

Patent Literature 1: Japanese Patent Application Laid-Open Publication No. 2006-134801
Patent Literature 2: Japanese Patent Application Laid-Open Publication No. 2005-317458

SUMMARY OF INVENTION

Technical Problem

As described above, the battery pack of FIG. 7 according to the related art can certainly achieve a size reduction with satisfactory resistance to vibrations. However, for example, while regenerative electric power is generated, in the case where the batteries (electrical storage elements) 101 are charged and charge/discharge of the batteries 101 is then repeated frequently to supply electric power to a load, a large amount of heat is generated due to the internal resistance of the batteries 101. In particular, in the battery pack, the battery 101 at the center portion surrounded by the adjacent batteries 101 is likely to trap heat, since the batteries 101 are stacked.

In the case where heat generation due to the charge/discharge is gentle, the heat is conducted to the other batteries 101. Thus, a uniformly heated state is to be achieved eventually. However, in the case where the heat generation rate is fast due to frequent charge/discharge, it takes time until the batteries 101 reach the uniformly heated state, during which a temperature difference is generated between the batteries 101. When this state is repeated, a period of time becomes long in which the specific battery 101 (the battery 101 at the center portion in this case) is in a high temperature state, and heat dissipation may be insufficient.

Figure 8:
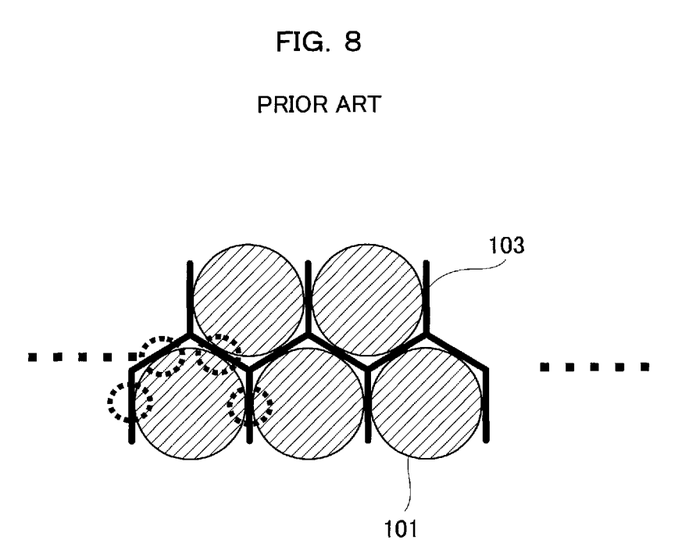
FIG. 8 is a cross-sectional view partially showing that batteries are contained in a spacer in the battery pack (electrical storage unit) according to the related art.

In response, a technique for a battery pack including a spacer 103 made of metal (for example, see Patent Literature 2) has been considered. This makes it easier for the spacer 103 to transfer heat, so that it is possible to shorten the time until the uniformly heated state is reached. However, in the battery pack of Patent Literature 2, according to the schematic cross-sectional view of the batteries 101 and the spacer 103 shown in FIG. 8, the high thermal conductive spacer 103 made of metal is used but the battery 101 and the spacer 103 contact only four points on the circular outer surface of the battery 101 as indicated by circular dotted lines. Thus, heat generated in the battery 101 is transferred to the spacer 103 only through the four contact points.

In this configuration, even if the spacer 103 is made of metal, in the case where the battery pack of the related art is used for frequent charge/discharge, heat dissipation may be still insufficient.

The present invention has been devised to solve the above-described problem. An object of the present invention is to provide an electrical storage unit concurrently having higher resistance to large vibrations applied to the electrical storage unit and more satisfactory heat dissipation from electrical storage elements.

Solution to Problem

In order to solve the problem, an electrical storage unit of the present invention includes: a plurality of cylindrically-shaped electrical storage elements electrically connected to each other; a holder made of metal having an arc-like concave surface for containing a part of the peripheral surface of the cylindrically-shaped electrical storage element; a fix plate attached to the holder so as to hold the electrical storage elements; and a first joining material placed between the peripheral surface of the electrical storage element and the concave surface of the holder to join the electrical storage element and the holder.

Advantageous Effects of Invention

According to the present invention, the joining material is interposed between the part of the peripheral surface of the electrical storage element contained in the concave surface of the holder and the concave surface of the holder, so that the overall part of the electrical storage element contained in the concave surface of the holder is firmly fixed to the holder with the joining material. Thus, even if large vibrations are applied to the electrical storage unit, it is unlikely that the electrical storage element is displaced or disengaged from the electrical storage unit. Further, heat is efficiently transferred from the electrical storage element to the holder via the joining material compared to the related art in which the electrical storage element contacts the spacer at only four points.

Thus, higher resistance to large vibrations applied to the electrical storage unit and more satisfactory heat dissipation from the electrical storage element can be effectively achieved.

DESCRIPTION OF EMBODIMENTS

The following will specifically describe an electrical storage unit according to an embodiment of the present invention with reference to the accompanying drawings.

Figure 1:
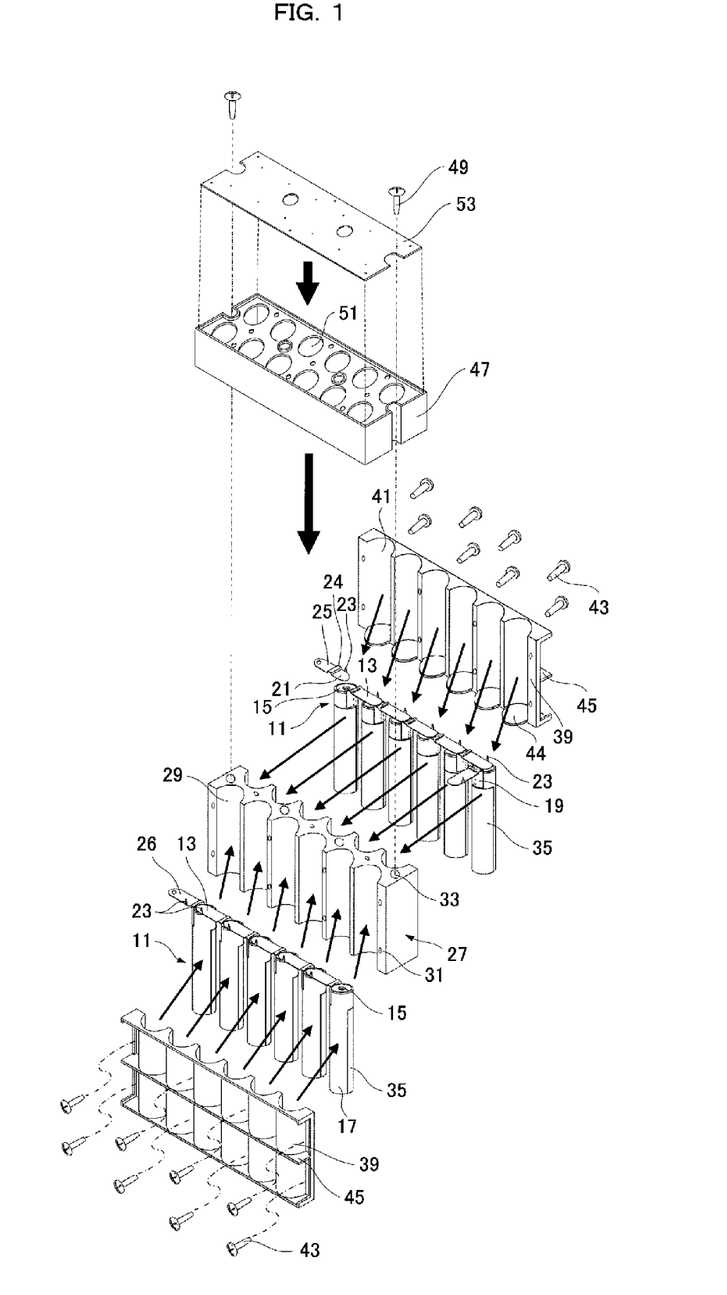
FIG. 1 is an exploded perspective view showing the overall structure of an electrical storage unit according to an embodiment of the present invention.
Figure 2A:
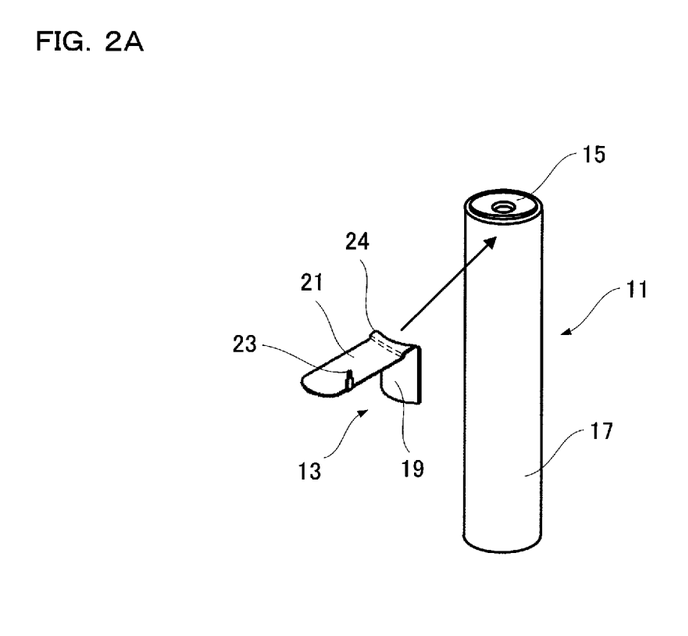
FIG. 2A is a perspective view showing the appearance structure of an electrical storage element before assembling in the electrical storage unit according to the embodiment.
Figure 2B:
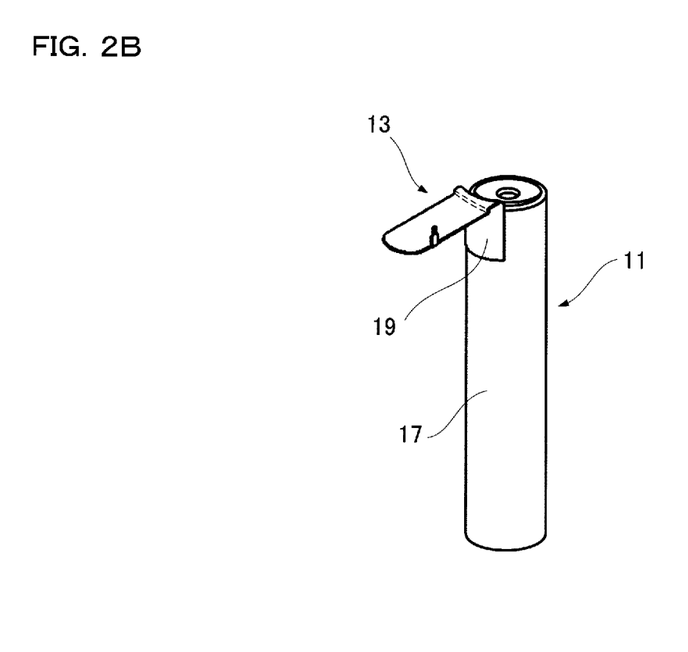
FIG. 2B is a perspective view showing the appearance structure of the assembled electrical storage element in the electrical storage unit according to the embodiment.
Figure 3:
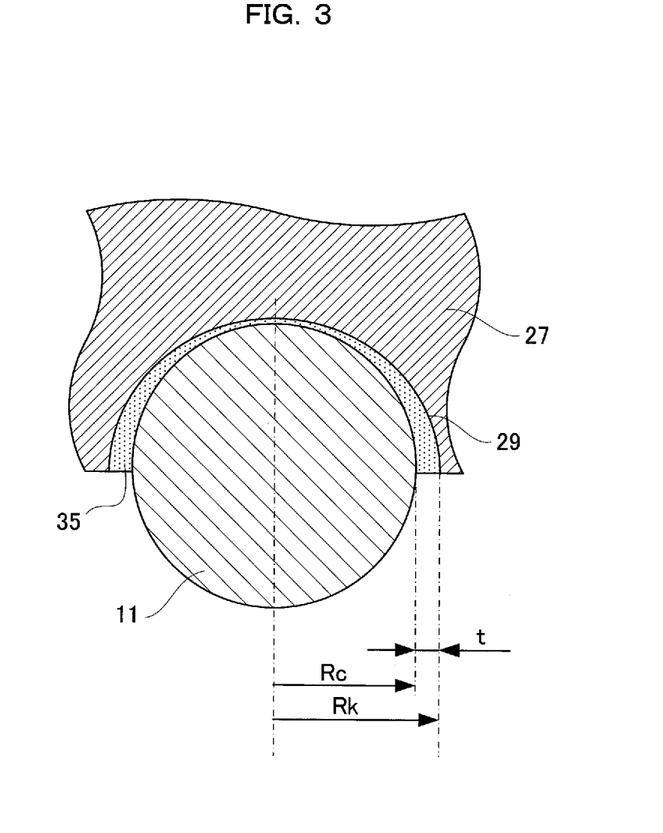
FIG. 3 is a cross-sectional view partially showing that the electrical storage element is contained in a holder in the electrical storage unit according to the embodiment.
Figure 4:
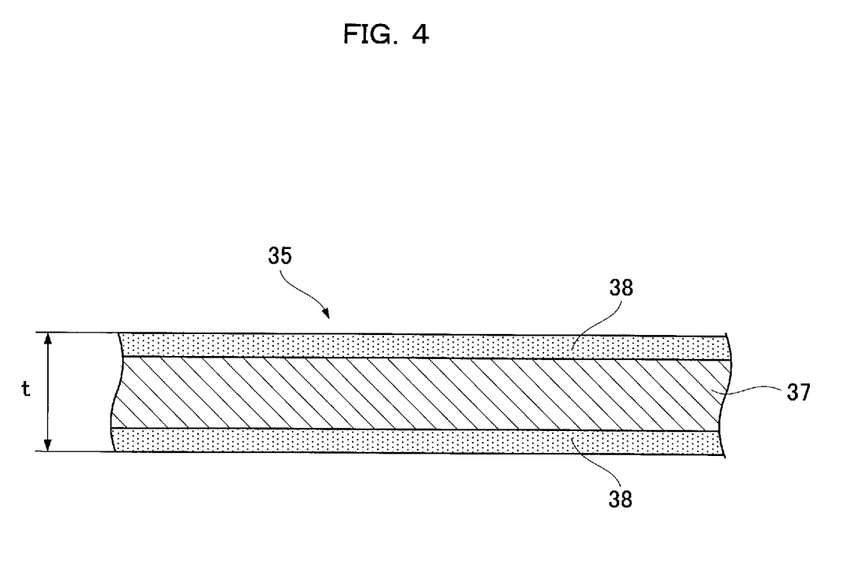
FIG. 4 is a cross-sectional view partially showing the sectional structure of double-sided adhesive tape in the electrical storage unit according to the embodiment.
Figure 5:
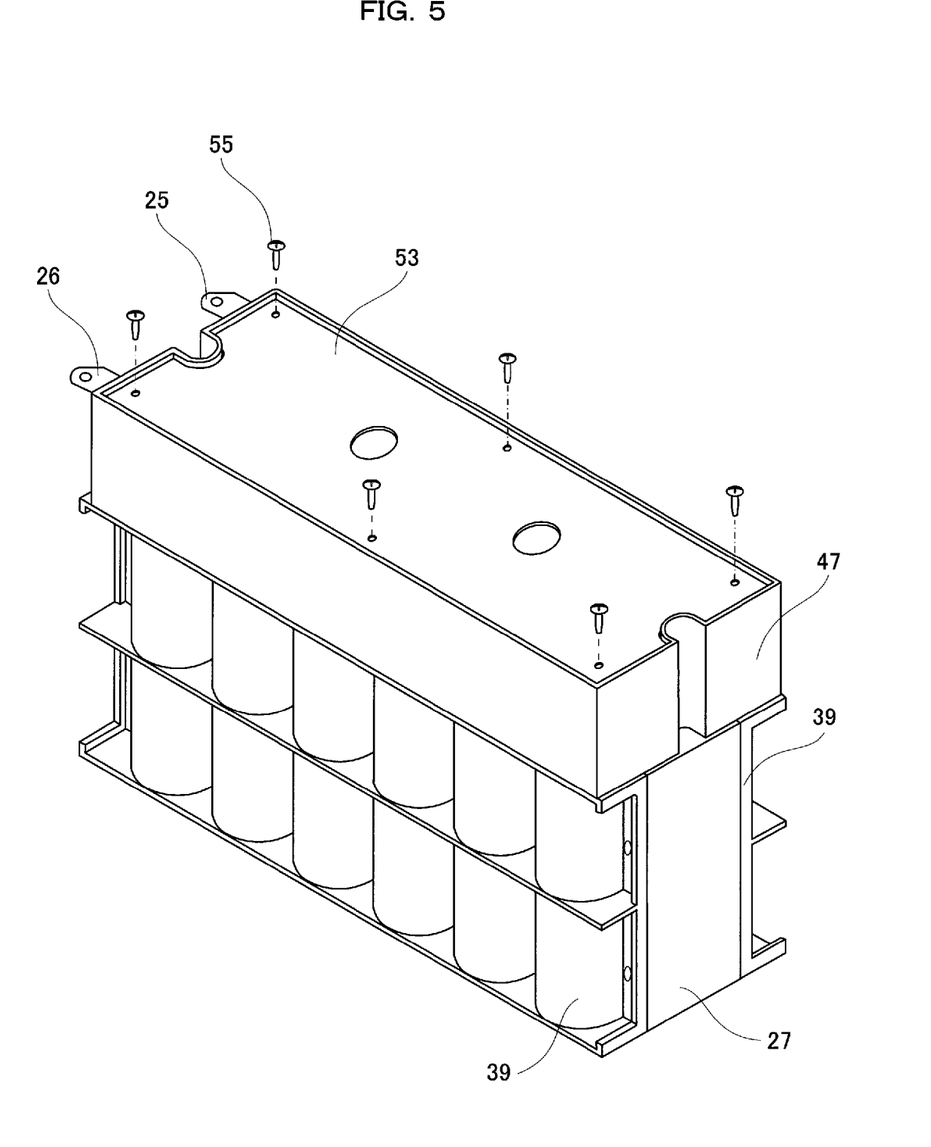
FIG. 5 is an appearance perspective view showing the overall structure of the assembled electrical storage unit according to the embodiment.
Figure 6:
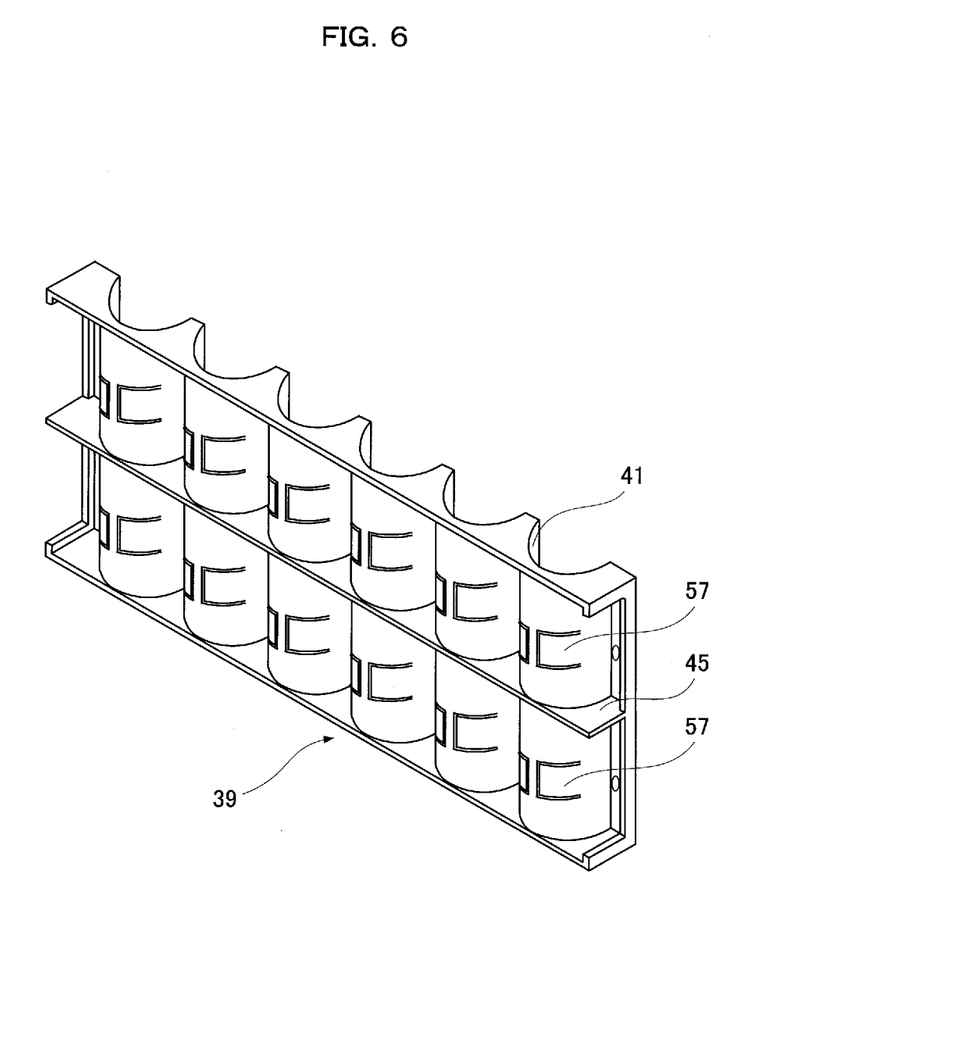
FIG. 6 is a perspective view showing another structural example of a fix plate in the electrical storage unit according to the embodiment.

FIG. 1 is an exploded perspective view showing the overall structure of the electrical storage unit according to the present embodiment. FIGS. 2A and 2B are perspective views each showing the appearance structure of an electrical storage element with a bus bar in the electrical storage unit according to the present embodiment. FIG. 2A is an exploded perspective view before assembling, and FIG. 2B is an exploded perspective view after assembling. FIG. 3 is a cross-sectional view partially and schematically showing that the electrical storage element is contained in a holder in the electrical storage unit according to the present embodiment. FIG. 4 is a cross-sectional view partially and schematically showing the sectional structure of double-sided adhesive tape in the electrical storage unit according to the present embodiment. FIG. 5 is an appearance perspective view showing the overall structure of the assembled electrical storage unit according to the present embodiment. FIG. 6 is a perspective view showing another structural example of a fix plate in the electrical storage unit according to the present embodiment.

In FIG. 1, twelve electrical storage elements 11 are used in the electrical storage unit. The adjacent electrical storage elements 11 are electrically connected to each other via bus bars 13. The twelve electrical storage elements 11 are all connected in series.

The electrical storage elements 11 and the bus bars 13 will be specifically described in accordance with FIGS. 2A and 2B. In FIG. 2A, the electrical storage element 11 is an electrical double layer capacitor which has large capacitance and excellence in rapid charge/discharge properties. As shown in FIG. 2A, the electrical storage element 11 has a circular cylindrical shape and one end (the upper end in FIG. 2A) constituting an end surface electrode 15. In the present embodiment, the end surface electrode 15 is a positive electrode. Further, the electrical storage element 11 is cylindrically formed by extruding an aluminum plate, and the peripheral surface of the cylinder constitutes a peripheral surface electrode 17. In the present, embodiment, the peripheral surface electrode 17 is a negative electrode.

The bottom surface of the electrical storage element 11 is also a negative electrode since the bottom surface is formed integrally with the peripheral surface, but an electrical connection is not made to the bottom surface in the present embodiment. Further, although not shown in FIG. 2A, an insulating material is interposed between the end surface electrode 15 and the peripheral surface electrode 17, so that electrical insulation is kept.

Next, the configuration of the bus bar 13 will be described. The bus bar 13 electrically connects the adjoining electrical storage elements 11 and is formed by press-molded aluminum. FIG. 2A shows the shape of the formed bus bar. The bus bar 13 is substantially L-shaped, and a peripheral surface electrode welded portion 19 is bent along the outer periphery of the peripheral surface electrode 17. Meanwhile, a bus bar terminal 23 is integrally formed on a flat end portion 21 of the bus bar 13. Further, a bent portion 24 is provided between the peripheral surface electrode welded portion 19 and the flat end portion 21.

With this configuration, when the flat end portion 21 is welded and connected to the end surface electrode 15 of the adjacent electrical storage element 11, the bent portion 24 can absorb a displacement, and when vibrations are applied from the outside to the overall assembled electrical storage unit, the bent portion 24 can reduce a stress applied to the welded and connected portion of the flat end portion 21 and the end surface electrode 15. Thus, it is possible to reduce the possibility of disengaging the welded portion of the flat end portion 21 and the end surface electrode 15 due to vibrations, and achieve favorable resistance to vibrations.

FIG. 2B shows that the bus bar 13 is connected to the electrical storage element 11. As described above, the peripheral surface electrode welded portion 19 of the bus bar 13 is shaped so as to fit to the outer periphery of the peripheral surface electrode 17 of the electrical storage element 11. Thus, the peripheral surface electrode welded portion 19 and the outer periphery of the peripheral surface electrode 17 are welded while being fitted to each other, so that a highly reliable electrical and mechanical connection can be achieved.

Back in FIG. 1, six electrical storage elements 11 are connected in series for each line by welding and connecting the end surface electrodes 15 of the adjacent electrical storage elements 11 and the flat end portions 21 of the bus bars 13. The welding is performed by using a jig for positioning such that the end surface electrodes 15 of the electrical storage elements 11 exactly contact the flat end portions 21 of the adjacent bus bars 13. The six electrical storage elements 11 configured thus are used along each of two lines, so that twelve electrical storage elements 11 can be connected in series. Thus, as shown in FIG. 1, the bus bar 13 in the back row, far right makes a 90-degree turn such that the bus bar overlaps the end surface electrode 15 in the front row, far right, and is welded and connected to the end surface electrode.

A bus bar 13 is absent adjacent to the end surface electrode 15 of the electrical storage element 11 in the back row, far left of FIG. 1. Thus, a positive electrode terminal 25 for the power input/output of all the electrical storage elements 11 is welded and connected to the end surface electrode 15 in the back row, far left. The positive electrode terminal 25 has such a tabular shape that the peripheral surface electrode welded portion 19 of the bus bar 13 is changed to the flat end portion 21 and is formed by molding aluminum similarly to the bus bar 13. Further, the bus bar terminal 23 and the bent portion 24 are integrally formed.

Meanwhile, an end surface electrode 15 is absent adjacent to the bus bar 13 of the electrical storage element 11 in the front row, far left of FIG. 1. Thus, the bus bar 13 is used as a negative electrode terminal 26 for the power input/output of all the electrical storage elements 11.

The following will describe an installation structure in which the electrical storage element 11 is attached to a holder 27.

The holder 27, as shown in FIG. 1, is a rectangular parallelepiped of metal (aluminum herein) including arc-like concave surfaces 29 for containing a part of the peripheral surfaces of the electrical storage elements 11 provided at multiple points (12 points herein). Further, screw holes 31 and screw holes 33 are provided for fastening fix plates and a case, which will be described later, with screws. The concave surface 29 is formed in a substantially semi-circular shape as the holder 27 of FIG. 1 is viewed from above. The holder 27 is formed by extruding or cutting.

The concave surfaces 29 are provided to prevent the electrical storage elements 11 from being stacked in a staggered manner. Thus, the heat capacity of the holder 27 can be increased. Further, the intervals between the electrical storage elements 11 are widened, so that the electrical storage elements 11 hardly affect each other with heat. As a result, favorable heat dissipation can be achieved.

Parts of the peripheral surfaces of the electrical storage elements 11 are contained in the concave surfaces 29 of the holder 27. At this point, the parts of the peripheral surfaces of the electrical storage elements 11 contained in the concave surfaces 29 and the concave surfaces 29 of the holder 27 are joined to each other by a joining material having insulation properties (hereinafter, will be referred to as an insulating joining material). The insulating joining material is used because the peripheral surface electrodes 17 of the electrical storage elements 11 are prevented from being electrically short-circuited when the electrical storage elements 11 are contained in the metal holder 27.

Double-sided adhesive tape 35 is used as the insulating joining material. Specifically, the double-sided adhesive tape 35 is attached to the peripheral portion of the electrical storage element 11 contained in the concave surface 29 and is further contained in the holder 27, so that the peripheral surface of the electrical storage element 11 is joined to the concave surface 29. In the configuration of FIG. 1, about half of the area of the peripheral surface of the electrical storage element 11 is fixed to the concave surface 29 with the double-sided adhesive tape 35. Instead of the above, after the double-sided adhesive tape 35 is first attached to the concave surface 29, the electrical storage element 11 may be contained in the concave surface 29.

The joined portions of the peripheral surfaces of the electrical storage elements 11 and the concave surfaces 29 of the holder 27 will be described with reference to FIG. 3.

FIG. 3 is a cross-sectional view partially and schematically showing that the electrical storage element is contained in the holder at the joined portion of the electrical storage element and the holder in the electrical storage unit according to the present embodiment. As is obvious from FIG. 3, in order to allow the concave surface 29 to contain the peripheral surface of the electrical storage element 11, a radius Rc of the electrical storage element 11 has to be smaller than a radius Rk of the concave surface 29. In such a dimensional relationship, the peripheral surface of the electrical storage element 11 contacts only one point on the circle of the concave surface 29 when the double-sided adhesive tape is not applied, so that a gap is generated in other portions. In this state, even when the electrical storage element 11 generates heat due to frequent charge/discharge, the heat cannot be efficiently dissipated from the holder 27.

In the present embodiment, in order to fill the gap, the peripheral surface of the electrical storage element 11 is joined to the concave surface 29 with the double-sided adhesive tape 35. In this case, as shown in FIG. 3, a thickness t of the double-sided adhesive tape 35 is not smaller than a difference between the radius Rk of the concave surface 29 and the radius Rc of the electrical storage element 11. Consequently, the gap between the peripheral surface of the electrical storage element 11 and the concave surface 29 which are joined with the double-sided adhesive tape 35 is entirely filled with the double-sided adhesive tape 35.

With this configuration, heat is transferred from the electrical storage element 11 through the double-sided adhesive tape 35 to the holder 27, so that the heat can be efficiently dissipated. Further, as described above, heat is dissipated by the metal holder 27 having larger heat capacity than the electrical storage element 11. Thus, even when the electrical storage element 11 is frequently charged or discharged, it is possible to reduce the possibility that the specific electrical storage elements 11 around the center portion of the electrical storage unit are in a high-temperature state.

The configuration of the double-sided adhesive tape 35 will be described in accordance with FIG. 4.

FIG. 4 is a cross-sectional view schematically and partially showing the sectional structure of the double-sided adhesive tape 35 in the electrical storage unit according to the present embodiment. The double-sided adhesive tape 35 has a laminate structure including a base material 37 and adhesive portions 38 formed on two sides of the base material 37. Although the adhesive portions 38 are actually formed thinner than the base material 37, for the sake of simplicity, the adhesive portions 38 are drawn thick in FIG. 4. Further, the sum of thicknesses of the base material 37 and the adhesive portions 38 on the two sides thereof is represented as the above-described thickness t of the double-sided adhesive tape 35 (=Rk−Rc).

In the double-sided adhesive tape 35 configured thus, first, elastic resin (for example, foil-like rubber) is used for the base material 37. Thus, as shown in FIG. 3, the peripheral surface of the electrical storage element 11 is contained in the concave surface 29, and the electrical storage element 11 is subjected to a stress pushing the electrical storage element 11 into the concave surface 29 when the electrical storage element 11 is held by the fix plate which will be described later, so that the base material 37 of the double-sided adhesive tape 35 is thinnest at the innermost part of the concave surface 29 and thickest at the outermost part of the concave surface 29. In other words, the thickness t of the double-sided adhesive tape 35 is non-uniform when the electrical storage element 11 is fixed by the holder 27 and the fix plate. Consequently, the gap between the electrical storage element 11 and the concave surface 29, which differ in radius, is entirely filled with the double-sided adhesive tape 35, so that heat can be efficiently dissipated.

Further, the adhesive portion 38 of the double-sided adhesive tape 35 contains a thermal conductive filler. The thermal conductive filler is a ceramic filler such as alumina filler and silica filler. This can improve the thermal conductivity of the adhesive portion 38 made of a resin composition. Moreover, the thermal conductive filler produces the following effects:

As described above, since the base material 37 is made of resin such as foil-like rubber, when the multiple (six in the present embodiment) electrical storage elements 11 are simultaneously pushed into the concave surfaces 29 by the fix plate which will be described later, stresses applied to the electrical storage elements 11 are varied in intensity. A large stress may be applied to a part of the base material 37 in some cases, so that the base material 37 may be cut. Alternatively, the base material 37 may be degraded due to vibrations or a thermal shock when the electrical storage unit is used, and a portion of the base material 37 in which a stress concentrates may be cut. If the base material 37 is cut, the base material 37 is absent on the cut portion. Further, since the adhesive portions 38 are thinner than the base material 37, the peripheral surface of the electrical storage element 11 directly contacts the concave surface 29, and an electrical conduction state (short circuit condition) may be obtained when the adhesive portion 38 does not contain a thermal conductive filler.

In contrast, in the double-sided adhesive tape 35 of the present embodiment, the adhesive portion 38 contains a thermal conductive filler. Thus, even if the electrical storage element 11 is pushed hard into the concave surface 29 and the base material 37 is degraded and cut, the thermal conductive filler evenly contained in the adhesive portion 38 is interposed between the peripheral surface of the electrical storage element 11 and the concave surface 29. Further, since the adhesive portions 38 are formed on the two sides of the base material 27, the amount of the interposed thermal conductive filler can be secured. Moreover, the thermal conductive filler has insulation properties. Due to these effects, it is possible to reduce the possibility that the peripheral surface of the electrical storage element 11 directly contacts the concave surface 29 to cause a short circuit, by using the double-sided adhesive tape 35 of FIG. 4, so that high heat dissipation and reliability can be concurrently achieved.

Back in FIG. 1, the electrical storage elements 11 contained in the holder 27 are further held by fix plates 39. The fix plate 39 is made of resin and has holding portions 41 including six arc-like concave surfaces for containing and holding parts of the cylindrically-shaped peripheral surfaces of the electrical storage elements 11. The holding portions 41 are dimensioned such that a small gap can be generated between the holder 27 and the fix plate 39 when the electrical storage elements 11 contained in the concave surfaces 29 are held by the holding portions.

In this configuration, when the fix plate 39 is attached to the holder 27, eight fix plate screws 43 are tightened up into the fix plate screw holes 31 to eliminate the gap, so that the fix plate 39 holds the electrical storage elements 11 with the elasticity of the resin of the fix plate while pushing the electrical storage elements 11 toward the holder 27.

As a result, the electrical storage elements 11 are joined to the holder 27 by the double-sided adhesive tape 35 and are firmly held by the elasticity of the fix plate 39. Thus, even when the electrical storage unit is used for applications in which vibrations are remarkable (for example, hybrid construction machinery), the electrical storage elements 11 are unlikely to be disengaged, and the bus bars 13 are unlikely to be disconnected, so that satisfactory resistance to vibrations can be obtained.

Bottom plates 44 are integrally formed at the lower ends of the holding portions 41 of the fix plate 39. Thus, the bottoms of the electrical storage elements 11 are shielded from the outside by the bottom plates 44. In this case, when the electrical storage elements 11 are held by the holding portions 41, the bottom plates 44 are formed so as not to contact the bottoms of the electrical storage elements 11. In this configuration, variations in height between the electrical storage elements 11 can be absorbed in gaps between the bottoms of the electrical storage elements 11 and the bottom plates 44.

With this configuration, the electrical storage elements 11 are entirely shielded from the outside by the concave surfaces 29, the holding portions 41, the bottom plates 44, and the case which will be described later, so that dust and impurities such as suspended particles can be suppressed from adhering to the electrical storage elements 11 and the bus bars 13. Thus, it is possible to reduce the possibility of corrosion of the electrical storage elements 11 and the bus bars 13 due to impurities, so that high reliability can be obtained.

On a surface of the fix plate 39 opposite to the holding portions 41, that is, on the outer wall surface of the fix plate 39, a fin 45 is integrally formed. This can increase the mechanical strength of the fix plate 39 and the surface area of the outer wall of the fix plate 39 by the fin 45, so that heat dissipation from the fix plate 39 can be improved. In the configuration of the fix plate 39 in FIG. 1, the fin 45 is provided on only one point in the center portion of the fix plate, but fins 45 may be provided at multiple points. The fin 45 may be provided along a vertical direction and so on instead of the horizontal direction in FIG. 1.

Next, in a state in which the fix plates 39 are fixed to two sides of the holder 27, as shown in FIG. 1, a case 47 is fixed on top of the holder 27. Specifically, case fixing screws 49 are tightened up into the screw holes 33 via the case 47 to fix the case 47. This allows the tops of the electrical storage elements 11, to which the double-sided adhesive tape 35 is not attached, to be contained in the case 47. As a result, the tops of the electrical storage elements 11 can be shielded from the outside as described above, reducing the adhesion of dust and so on.

The case 47 is made of resin and includes a plurality of holes 51 on the top surface of the case 47. The bus bar terminals 23 integrally formed on the bus bars 13 are made to protrude from the top surface of the case 47 through the holes 51. A circuit board 53 is placed on the top surface of the case 47. In this case, the bus bar terminals 23 are inserted through terminal holes (not shown) provided on the circuit board 53 and are soldered, so that the circuit board 53 and the bus bar terminals 23 are electrically connected.

As a result, the circuit board 53 can detect voltages at the electrical connection points of the electrical storage elements 11. Further, the circuit board 53 includes a balancing circuit (not shown) for balancing voltages between opposite ends of the electrical storage elements 11 according to the detected voltages. The balancing circuit can also control the voltages of the electrical storage elements 11 via the bus bar terminals 23. The circuit board 53 includes a plurality of electronic components constituting a voltage detecting circuit and the balancing circuit which are not shown in FIG. 1.

FIG. 5 is a perspective view showing the assembled electrical storage unit described above. The circuit board 53 is fixed to the case 47 by six screws 55. The positive electrode terminal 25 and the negative electrode terminal 26 are connected to an external charge/discharge circuit (not shown). When a plurality of electrical storage units are used according to power specifications, the positive electrode terminals 25 and the negative electrode terminals 26 of the electrical storage units may be connected in series or in parallel.

When the plurality of electrical storage units are used, the holder 27 is desirably fixed on a metal base (not shown) having large heat capacity. With this configuration, heat can be swiftly transferred from the holder 27 to the base, so that heat can be further efficiently dissipated. If the base is water-cooled, higher heat dissipation can be achieved.

Next, an example of how such an electrical storage unit is assembled will be described by reference to FIG. 1.

First, the electrical storage elements 11 having the double-sided adhesive tape 35 and the bus bars 13 attached and welded thereto are arranged in the holding portions 41 of the fix plate 39. At this point, a jig (not shown) is used to position the electrical storage elements 11 in the height direction and arrange the electrical storage elements 11 such that the bus bars 13 contact the adjoining end surface electrodes 15.

Next, the end surface electrodes of the electrical storage elements 11 arranged by the fix plate 39 and the jig and the flat end portions 21 of the bus bars 13 are welded and connected to each other.

Subsequently, the protective sheet (not shown) of the double-sided adhesive tape 35 is peeled off, and the fix plates 39 are fixed to the holder 27 by the screws 43 such that the electrical storage elements 11 are contained in the concave surfaces 29 of the holder 27. After the electrical storage elements 11 in two rows are fixed to the holder 27, the bus bar 13 connected to the electrical storage element 11 in the back row, far right and the end surface electrode 15 of the electrical storage element 11 in the front row, far right are welded and connected to each other. Further, the positive electrode terminal 25 is welded and connected to the end surface electrode 15 in the back row, far left.

The case 47 is then fixed to the holder 27 with the screws 49. Thereafter, the circuit board 53 is electrically connected to the bus bar terminals 23 and is mechanically connected to the case 47 with the screws 55.

The above-described assembling method is just an example. In addition to the above-described example, any method may be adopted as long as steps are performed in such an order that the electrical storage unit can be assembled. For example, the step of fixing the electrical storage elements 11 to the holder 27 may be performed first.

In the above-described configuration, the parts of the peripheral surfaces of the electrical storage elements 11 contained in the concave surfaces 29 of the holder 27 are joined to the concave surfaces 29 of the holder 27 with the double-sided adhesive tape 35 (insulating joining material), so that the electrical storage elements 11 are firmly fixed to the holder 27 to increase resistance to vibrations. Further, since the double-sided adhesive tape 35 is interposed between the peripheral surfaces of the electrical storage elements 11 and the concave surfaces 29, heat can be efficiently transferred from the electrical storage elements 11 through the double-sided adhesive tape 35 to the holder 27, so that favorable heat dissipation can be obtained. Thus, an electrical storage unit can be achieved with resistance to vibrations and high heat dissipation.

In the present embodiment, the fix plate 39 is made of resin but may be made of metal (for example, aluminum). This allows heat from the electrical storage elements 11 to be dissipated also from the fix plates 39, thereby achieving higher heat dissipation. In addition, a large number of fins 45 made of metal are formed on the outer wall surface of the fix plate 39 made of metal, thereby further achieving higher heat dissipation.

In the case where the fix plate 39 is made of metal, however, the insulating joining material has to be interposed between the concave surfaces (holding portions 41) of the fix plate 39 and the peripheral surfaces of the electrical storage elements 11 in order to provide insulation between the electrical storage elements 11. Specifically, when the insulating joining material is the double-sided adhesive tape 35, the peripheral surfaces of the electrical storage elements 11 may be entirely covered by the double-sided adhesive tape 35. In this case, the radius of the concave surface of the fix plate 39 is determined such that a difference from the radius Rc of the electrical storage element 11 is not larger than the thickness t of the double-sided adhesive tape 35 similarly to the radius Rk of the concave surface 29 of the holder 27.

In the present embodiment, the fix plate 39 is fastened to the holder 27 with the screws 43, so that the elasticity of the fix plate 39 generates stresses pushing the electrical storage elements 11 into the concave surfaces 29. However, as shown in FIG. 6, an elastic portion 57 may be provided on at least one portion of the fix plate 39 contacting the electrode storage element 11. As the elastic portion 57, for example, rectangular cantilevers are integrally formed at multiple points as shown in FIG. 6. At this point, the elastic portion 57 is warped toward the holding portion 41.

With this configuration, when the fix plate 39 is fixed to the holder 27, the elastic portions 57 push the peripheral surfaces of the electrical storage elements 11, so that stresses can be applied to the electrical storage elements 11 more reliably than push stresses due to the elasticity of the overall fix plate 39 in the configuration of FIG. 1. Thus, firmer fixation can be achieved against vibrations. In this case, the material of the fix plate 39 may be resin or metal.

In the present embodiment, when the peripheral surfaces of the electrical storage elements 11 are joined to the concave surfaces 29, the double-sided adhesive tape 35 is used as the insulating joining material but may be an adhesive containing a thermal conductive filler. In this case, since the adhesive has plasticity, the adhesive layer becomes thin by pushing the electrical storage elements 11 into the concave surfaces 29 similarly to the rubber base material 37 of the double-sided adhesive tape 35, so that satisfactory thermal conductivity can be obtained. Further, the adhesive can be evenly spread in a gap between the peripheral surface of the electrical storage element 11 and the concave surface 29, so that firm holding can be achieved.

In this case, when the electrical storage elements 11 are excessively pushed into the concave surfaces 29, the peripheral surface electrodes 17 of the electrical storage elements 11 may contact the holder 27, thereby causing an electrical short circuit. Thus, the adhesive contains a ceramic thermal conductive filler. This makes it possible to reduce the possibility of a short circuit between the peripheral surface electrodes 17 and the holder 27 since the thermal conductive filler is interposed between the electrical storage elements 11 and the concave surfaces 29 even when the electrical storage elements 11 are pushed into the concave surfaces 29.

As described above, since the adhesive has higher plasticity than the double-sided adhesive tape 35, the adhesive can be interposed as thinly as possible between the peripheral surfaces of the electrical storage elements 11 and the concave surfaces 29. Thus, favorable heat dissipation can be obtained. However, the steps of applying and curing the adhesive uniformly are required, so that the assemblability is inferior to that of the double-sided adhesive tape 35. Thus, in accordance with the required heat dissipation and ease of assembly, any insulating joining material may be used as appropriate. Further, the adhesive may be placed between the concave surfaces (holding portions 41) of the fix plate 39 and the peripheral surfaces of the electrical storage elements 11.

In the present embodiment, the electrical storage element 11 has the peripheral surface electrode 17 but may have an insulating portion such as an insulating tube on the peripheral surface thereof. In this case, similarly to a battery 101 in FIG. 7, the electrical storage element 11 includes end surface electrodes on two ends of the cylinder of the electrical storage element. Thus, the peripheral surface of the electrical storage element 11 is insulated by the insulating tube, so that a joining material for joining the electrical storage element to the holder 27 does not have to be insulative. For example, in the case where the double-sided adhesive tape 35 is used, the adhesive portion 38 can contain a thermal conductive filler such as a metal. Thus, the thermal conductivity of the double-sided adhesive tape 35 is improved compared to a thermal conductive filler made of ceramic and so on.

Further, in the case where the adhesive is used, the adhesive may contain the conductive filler. However, the insulating tube is thicker than the double-sided adhesive tape 35 of the present embodiment and the adhesive, so that the thermal resistance of the insulating tube is larger accordingly. Thus, especially when charge/discharge is performed with a high frequency, even if the conductive filler is used, the coolability may be insufficient. In this case, the configuration of the present embodiment is desirable.

The electrical storage element 11 of the present embodiment is an electrical double layer capacitor but may be other capacitors such as an electrochemical capacitor or a secondary battery.

INDUSTRIAL APPLICABILITY

Since the electrical storage unit according to the present invention can realize resistance to vibrations and high heat dissipation concurrently, the present invention is particularly useful as an electrical storage unit for charging and discharging electrical storage elements frequently.

The invention claimed is:
1. An electrical storage unit, comprising:
a plurality of cylindrically-shaped electrical storage elements electrically connected to each other and arranged in a plurality of rows, the plurality of cylindrically-shaped electrical storage elements each having a peripheral surface, the peripheral surface being an electrode;
a single-piece rectangular parallelepiped holder formed to have plane symmetry and being a solid metallic body, the single-piece rectangular parallelepiped holder arranged only between two rows of the cylindrically-shaped electrical storage elements and having two major outside surfaces and a plurality of substantially identical arc-shaped concave surfaces on each of the two major outside surfaces opposing each other, the arc-shaped concave surfaces extending substantially parallel in a same direction along each of the two major outside surfaces continuously from a first end of the single-piece rectangular parallelepiped holder to a second end of the single-piece rectangular parallelepiped holder opposite the first end, wherein the first end of the single-piece rectangular parallelepiped holder corresponds to a first end of the cylindrically-shaped electrical storage elements and the second end of the single-piece rectangular parallelepiped holder corresponds to a second end of the cylindrically-shaped electrical storage elements,
wherein each of the two major outside surfaces include an equal number of the plurality of arc-shaped concave surfaces, each of the plurality of arc-shaped concave surfaces is configured to contain a part of the peripheral surface of one of the cylindrically-shaped electrical storage elements that extends from a vicinity of a first end of the cylindrically-shaped electrical storage elements to a vicinity of a second end of the cylindrically-shaped electrical storage elements in a direction of a longitudinal axis of the cylindrically-shaped electrical storage elements, and the plurality of arc-shaped concave surfaces are substantially semi-circular in shape;
a fix plate placed opposite one of the major outside surfaces and placed only on an outer side of the cylindrically-shaped electrical storage elements and attached to the single-piece rectangular parallelepiped holder so as to hold a row of the plurality of cylindrically-shaped electrical storage elements between the fix plate and the single-piece rectangular parallelepiped holder; and
a first joining material placed only between the part of the peripheral surface of each of the cylindrically-shaped electrical storage elements and the plurality of arc-shaped concave surfaces of the single-piece rectangular parallelepiped holder to join the cylindrically-shaped electrical storage element and the single-piece rectangular parallelepiped holder, the first joining material being a double-sided adhesive tape which comprises an insulating material and a thermal conductive filler having insulation properties, the double-sided adhesive tape having a thickness not smaller than a difference between a radius of the concave surface of the single-piece rectangular parallelepiped holder and a radius of the cylindrically-shaped electrical storage element, and
wherein an entire peripheral surface of each of the cylindrically-shaped electrical storage elements is covered with the single-piece rectangular parallelepiped holder or the fix plate.

2. The electrical storage unit according to claim 1, wherein the fix plate is made of an insulating material having elasticity, and has an arc-shaped concave surface for containing another part of the peripheral surface of the cylindrically-shaped electrical storage element.

3. The electrical storage unit according to claim 1, wherein the fix plate is made of metal and has an arc-shaped concave surface for containing another part of the peripheral surface of the cylindrically-shaped electrical storage element, and
the electrical storage unit further comprises a second joining material which is made of an insulating material and is placed between the peripheral surface of the cylindrically-shaped electrical storage element and the concave surface of the fix plate to join the cylindrically-shaped electrical storage element and the fix plate.

4. The electrical storage unit according to claim 3, wherein the second joining material is double-sided adhesive tape which comprises an insulating material and has a thickness not smaller than a difference between a radius of the concave surface of the fix plate and the radius of the cylindrically-shaped electrical storage element.

5. The electrical storage unit according to claim 1, wherein the first joining material is formed so as to be non-uniform in thickness when the cylindrically-shaped electrical storage element is fixed by the single-piece rectangular parallelepiped holder and the fix plate.

6. The electrical storage unit according to claim 4, wherein the second joining material has adhesive portions on two surfaces thereof, the adhesive portion containing a thermal conductive filler.

7. The electrical storage unit according to claim 6, wherein the second joining material is formed so as to be non-uniform in thickness when the cylindrically-shaped electrical storage element is fixed by the single-piece rectangular parallelepiped holder and the fix plate.

8. The electrical storage unit according to claim 1, wherein the fix plate has a fin formed on an outer wall surface thereof.

9. The electrical storage unit according to claim 1, wherein the fix plate has an elastic portion formed on at least a portion thereof, the portion contacting the cylindrically-shaped electrical storage element.

10. The electrical storage unit according to claim 1, wherein the fix plate includes a bottom plate closing a longitudinal end of each of the plurality of arc-shaped concave surfaces of the fix plate.

11. The electrical storage unit according to claim 10, wherein the bottom plate is integrally formed with the fix plate and is configured to shield the plurality of cylindrically-shaped electrical storage elements from impurities.

12. The electrical storage unit according to claim 10, wherein the bottom plate is spaced from the plurality of cylindrically-shaped electrical storage elements such that the bottom plate does not directly contact an end of the cylindrically-shaped electrical storage elements.

13. An electrical storage unit, comprising:
a plurality of cylindrically-shaped electrical storage elements electrically connected to each other and arranged in a plurality of rows;
a single-piece rectangular parallelepiped holder formed to have plane symmetry and being a solid metallic body, the single-piece rectangular parallelepiped holder arranged only between two rows of the cylindrically-shaped electrical storage elements and having two major outside surfaces, and a plurality of substantially identical arc-shaped concave surfaces on each of the two major outside surfaces opposing each other, the arc-shaped concave surfaces extending substantially parallel in a same direction along each of the two major outside surfaces continuously from a first end of the single-piece rectangular parallelepiped holder to a second end of the single-piece rectangular parallelepiped holder opposite the first end, wherein the first end of the single-piece rectangular parallelepiped holder corresponds to a first end of the cylindrically-shaped electrical storage elements and the second end of the single-piece rectangular parallelepiped holder corresponds to a second end of the cylindrically-shaped electrical storage elements,
wherein each of the two major outside surfaces include an equal number of the plurality of arc-shaped concave surfaces, each of the plurality of arc-shaped concave surfaces is configured to contain a part of a peripheral surface of one of the cylindrically-shaped electrical storage elements that extends from a vicinity of a first end of the cylindrically-shaped electrical storage elements to a vicinity of a second end of the cylindrically-shaped electrical storage elements in a direction of a longitudinal axis of the cylindrically-shaped electrical storage elements, and the plurality of arc-shaped concave surfaces are substantially semi-circular in shape;
a fix plate placed opposite one of the major outside surfaces and having a plurality of arc-shaped concave surfaces for containing another part of the peripheral surface of the cylindrically-shaped electrical storage elements attached to the single-piece rectangular parallelepiped holder so as to hold the cylindrically-shaped electrical storage elements between the fix plate and the single-piece rectangular parallelepiped holder, the plurality of arc-shaped concave surfaces being substantially semi-circular in shape; and
a first joining material comprising an adhesive placed only between the part of the peripheral surface of each of the cylindrically-shaped electrical storage elements and the plurality of arc-shaped concave surfaces of the single-piece rectangular parallelepiped holder to join the cylindrically-shaped electrical storage element and the single-piece rectangular parallelepiped holder,
the first joining material being a double-sided adhesive tape which comprises an insulating material and a thermal conductive filler having insulation properties, the double-sided adhesive tape having a thickness not smaller than a difference between a radius of the concave surface of the single-piece rectangular parallelepiped holder and a radius of the cylindrically-shaped electrical storage element, and
wherein an entire peripheral surface of each of the cylindrically-shaped electrical storage elements is covered with the single-piece rectangular parallelepiped holder or the fix plate.

* * * * *